United States Patent [19]
Bauer

[11] Patent Number: 4,503,014
[45] Date of Patent: Mar. 5, 1985

[54] MIXING HEAD

[75] Inventor: Adolf Bauer, Olching, Fed. Rep. of Germany

[73] Assignee: Krauss-Maffei AG, Munich, Fed. Rep. of Germany

[21] Appl. No.: 461,632

[22] Filed: Jan. 27, 1983

[30] Foreign Application Priority Data

Feb. 26, 1982 [DE] Fed. Rep. of Germany ....... 3006996
Oct. 15, 1982 [DE] Fed. Rep. of Germany ....... 3238258

[51] Int. Cl.$^3$ .......................... B01F 5/04; B01F 15/02
[52] U.S. Cl. ..................................... 422/135; 366/137; 366/159; 366/173; 422/133; 422/224; 521/917
[58] Field of Search ....................... 422/133, 135, 224; 366/137, 159, 173; 251/63; 521/917; 261/DIG. 26; 137/625.4, 625.48; 252/359 E

[56] References Cited

U.S. PATENT DOCUMENTS 4,099,919 7/1978 Leidal ............................ 366/173 X
4,226,543 10/1980 Schlutër ........................ 422/135 X

*Primary Examiner*—Barry S. Richman
*Assistant Examiner*—William R. Johnson
*Attorney, Agent, or Firm*—Karl F. Ross; Herbert Dubno

[57] ABSTRACT

A mixing head for two or more reactive components especially anionically polymerizing caprolactam comprises a piston formed with recess means which, at the end turn toward the outlet of the mixing chamber, intercept respective streams of the components which are normally trained upon one another and thus prevent mixing just before the piston blocks the ports through which these streams are directed into the mixing chamber.

13 Claims, 4 Drawing Figures

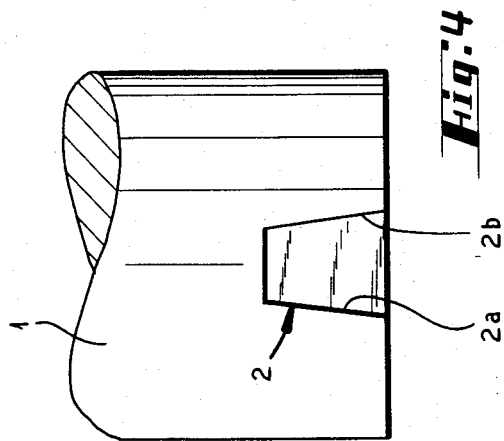
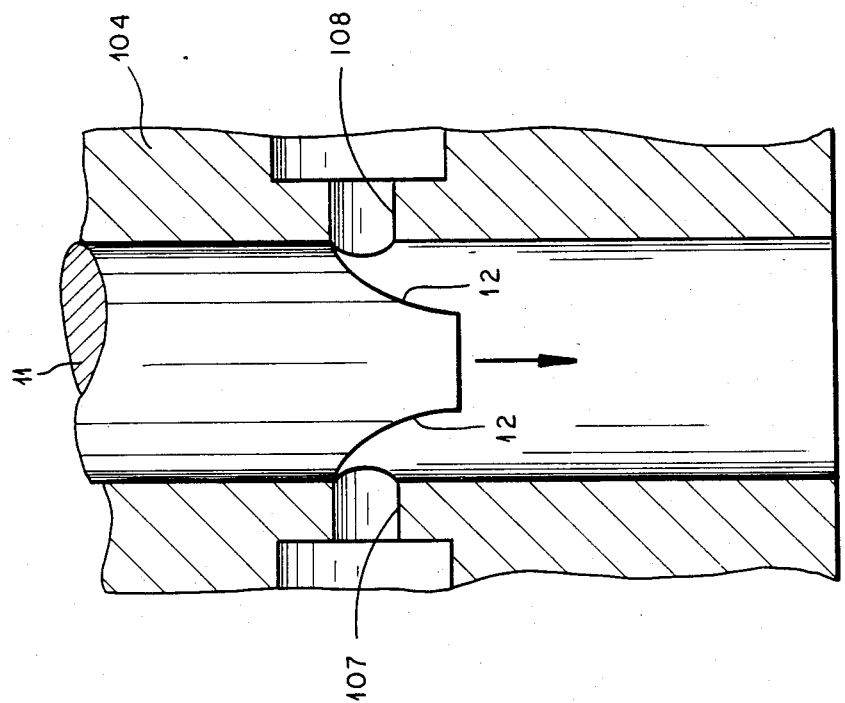

MIXING HEAD

CROSS REFERENCE TO RELATED APPLICATIONS

The present application is related to my commonly assigned copending application Ser. No. 426,102 filed Sept. 28, 1982 and referring, in turn, to a copending application Ser. No. 229,945 filed Jan. 30, 1981, now U.S. Pat. No. 4,379,122. These earlier applications also have reference to certain patents which may be of interest, namely, commonly assigned U.S. Pat. Nos. 3,706,515, 3,975,128, 4,167,236, 4,211,345 and 4,226,543. These patents, the references therein cited, the references herein made of record and the German patent mentioned specifically below constitute the best art currently known to applicant in this field.

FIELD OF THE INVENTION

My present invention relates to a mixing head for the mixing of two or more interreactive components and especially synthetic resin components. More particularly, the invention relates to a mixing head of the type in which streams of two interreactive components are directed into a common mixing chamber and against one another so as to bring about intimate mixing of the components within this chamber.

BACKGROUND OF THE INVENTION

As will be apparent from the earlier publications and applications mentioned previously, mixing heads for intimately mixing two or more interreactive synthetic resin components, wherein resin components are directed in respective streams against one another into a mixing chamber so that the streams impinge upon one another, have been provided heretofore. Among the reactive systems for which such heads can be used, is the anionic polymerization of caprolactam.

From the prior patents listed, it should be apparent that an important characteristic of these mixing heads is the presence of a control member or piston which, upon retraction, unblocks the ports admitting the oppositely directed streams of the reactants to the mixing chamber and, when advanced, blocks the ports and drives the mixing procedure from the mixing chamber.

The position in which the ports are unblocked and the mixing chamber is left clear to permit intermingling and interaction of the reactive components is referred to as the mixing phase or position, and the position in which the ports are blocked and the residue is completely expelled from the chamber is referred to as the nonmixing phase or position. In the latter phase, the end face of the piston may lie flush with the end of the mixing chamber bore.

These two phases will be readily appreciated with reference to German Pat. No. 20 07 935.

Especially when one works with caprolactam, one finds a tendency for premature reaction because of the especially high mixing and reactive tendencies of the components. This can give rise to problems. For example, if just prior to blockage of the ports or orifices and entry into the nonmixing phase, even miniscule amounts of one component enter the port of the other component, during the subsequent nonmixing phase the reaction at this port will block the latter or even generate a prereacted particle, droplet or slug of material which, if driven into the mold, will detrimentally affect the uniformity of the next product made.

Thus in some cases, there is total or partial blockage of one or both of the ports because of the inability to completely prevent traces from one material with mixing with the other within the port just prior to blockage of the ports. Even if the ports are not blocked, the reacted materials create defects in the subsequent product. Finally, partial or complete obstruction of one or both of the ports may result in defective products because of changes in the proportions of the two components in the mixture which ultimately reaches the mold.

OBJECTS OF THE INVENTION

It is, therefore, the principal object of the present invention to provide an improved mixing head which obviates the aforedescribed problem.

Another object is to provide a mixing head, especially for highly miscible and highly interactive components, which is capable of preventing undesired mixing of the components within the ports just prior to the commencement of a nonmixing phase.

SUMMARY OF THE INVENTION

These objects and others which will become apparent hereinafter are attained, in accordance with the invention, with a mixing head having a plunger shiftable between its mixing position and nonmixing position as described which, in addition, is formed with respective recess means turned toward the respective ports adjacent the leading end face of this piston or plunger and defining a small flow cross section directed into the mixing chamber between the end face and the outlet as the piston or plunger is moved from the mixing phase to the nonmixing phase. As a result of these recess means, the flow cross section for the stream emerging from each port just prior to closure is briefly reduced and baffled so that it no longer is directed opposite the other flow cross section and the combination of baffling and velocity increase completely prevents any possibility of one component passing back along the stream of the other into the port of the latter. More specifically, the control piston adjacent its end turned toward the outlet is formed with a pair of laterally bounded recess means open at this end and toward the respective ports, the pocketed portion of the piston projecting axially past the ports in the direction of the outlet end of the mixing chamber.

For a brief period as the leading end of the piston moves past the ports, therefore, direct impingement of the two streams upon each other is interrupted, the velocity of each stream adjacent the port is increased and the flow direction of each stream altered, i.e. transformed from a radial flow direction into an axial flow direction. The decrease in cross section is accompanied by a temporary increase in velocity and hence for the brief periods that the ports discharge into the recess means, the components on one side cannot enter the port on the opposite side and react with the other component.

According to a feature of the invention, the recess means have cross sections which increase toward the outlet. This permits the material within the recess means to readily extract therefrom upon retraction of the piston. The recess means may have a length in the axial direction which can be up to a third of the axial length of the chamber as measured in terms of the stroke of the piston and preferably this length is up to a fifth of the stroke of the piston.

It has been found to be advantageous moreover to form the recess means over their entire length on a portion of the piston which is not necessary for the guidance thereof or, put otherwise, in such a position that the piston and sealing or guiding means of the housing will not encounter these recess means.

BRIEF DESCRIPTION OF THE DRAWING

The above and other objects, features and advantages of the present invention will become more readily apparent from the following description, reference being made to the accompanying drawing in which:

FIG. 3 illustrates the latter piston juxtaposed with its ports; and

FIG. 4 is an elevational view showing the recess means of the piston of FIG. 1.

SPECIFIC DESCRIPTION

Figure 1:
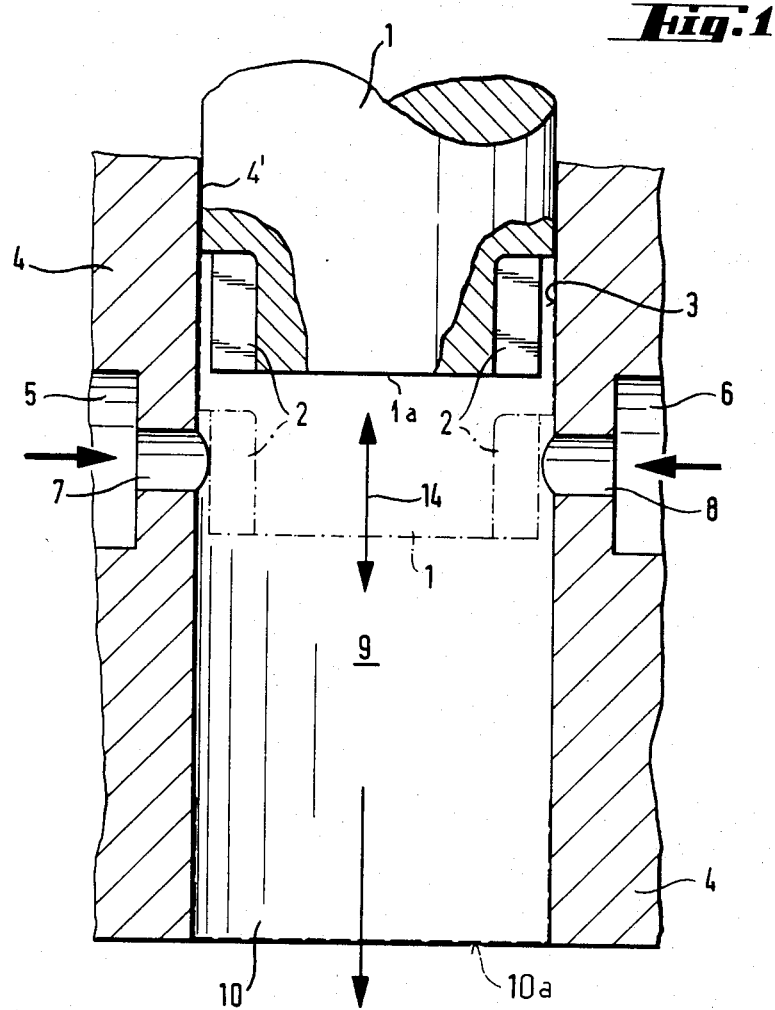
FIG. 1 is an axial section through a portion of a mixing head of the invention.

In FIGS. 1 and 4 of the drawing, I have shown a control piston 1 which is axially shiftable in a bore 3 of a housing 4 by means not shown, e.g. the fluid-responsive means described in the aforementioned copending applications and U.S. patents.

The piston is displaceable axially as represented by the arrow 14 and has a mixing position shown in solid lines in FIG. 1 and a nonmixing position in which the end face 1a lies flush with the end face 10a at the outlet end of the bore. This outlet end 10 also serves as the discharge port for the mixing chamber 9 formed between the end face 1a and the end face 10a when the piston is in its mixing position.

In this upper position of piston 1, two inlets 5 and 6 for the interreactive components communicate via the respective ports, orifices or nozzles 7 and 8 with the mixing chamber so that the two components are fed under pressure into this chamber and form radial streams from the respective ports which are trained on one another. The two streams of material thus intimately mix within the chamber 9 and are discharged into a mold (now shown) through the outlet 10. A guide means 4° formed by the housing 4 above the mixing or upper position of piston 1 for enabling axial displacement thereof.

When mixing is to be terminated, the piston is advanced downwardly, thereby blocking the ports 7 and 8 and driving the mixture from the mixing chamber into the mold, thereby cleaning the mixing chamber and preparing the system for the next mixing phase.

If desired, recirculation grooves can be formed in the piston 1 (see the aforementioned German patent) so that the blocked components can be recirculated to respective reservoirs.

In dot-dash lines in FIG. 1, I have also shown an intermediate position of the piston, namely, a position assumed by the piston just before the piston in its descent blocks the ports 7 and 8. In this position, the two components are no longer trained upon one another and for a brief period mixing is prevented.

The piston is formed in the region adjacent its end face 1a with recess means 2 which catch the respective stream and redirect them axially downwardly. Since the cross section of these recess means is smaller than the cross section of the mixing chamber, the velocity of the stream within the bore 3, upon interception by the recess means, is somewhat accelerated and, because the streams are redirected, direct mixing is no longer possible so that there is no danger that, at the end of the mixing phase, even the slightest portion of one component can enter the port of the other component. As can be seen from FIG. 4, the recess means 2 are each defined by a pair of planar lateral flanks 2a ad 2b which define a downwardly widening cross section. Any residue which remains in the recess means in liquid or solidified form is thus readily released when the piston is retracted in prepraration for the next phase.

similarly, the recess means can be of a conically divergent configuration in the direction of the open end of the chamber.

Figure 2:
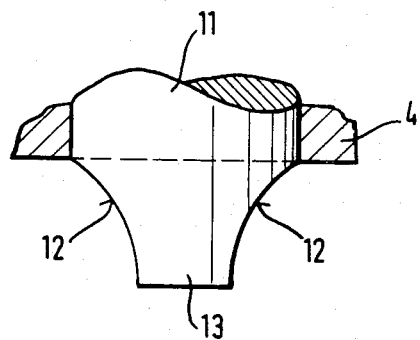
FIG. 2 shows an end of another piston in accordance with the invention.

FIGS. 2 and 3 show an embodiment of the invention in which the recess means 12 are of cylindrical segmental form and thus deflect the streams downwardly more smoothly from the ports 107, 108 of the mixing head 104.

Recess means of the type in the piston 11 can be larger than those formed by the recesses 2. It has been found to be advantageous with this embodiment to have the end 13 of the piston and the recess means project beyond the end of the head 4 (see FIG. 2) so that any residues in the recess means to the extent that they do not fall off by themselves, are readily removed by a brush or the like.

I claim:

1. A mixing head for a plurality of reactants comprising:

means defining a bore forming a mixing chamber and having an outlet at one end thereof;

means defining at least one pair of inlet ports, means supplying one of said reactants to one port of each of said pair and supplying another of said reactants to the other port of each of said pair, each of said pair of ports being positioned to provide impingement of the streams issuing therefrom within said mixing chamber; and a piston axially displaceable in said bore from a position in which said ports are unblocked and mixing of said components can occur in said chamber, into a position in which said piston blocks said ports, said piston being formed with an end face pointing toward said outlet, and respective recess means in said piston, said recess means opening into said end and being open toward the respective ports for intercepting the respective streams just before said piston blocks said port in order to divert said issuing streams out of direct impingement with each other during the piston movement.

2. A mixing head defined in claim 1 wherein said piston is provided with longitudinal guide means for enabling axial displacement thereof, said guide means being located at a position spaced from said recess means.

3. A mixing head defined in claim 1 wherein said recess means are defined by downwardly divergent planar flanks.

4. A mixing head defined in claim 1 wherein said recess means are defined by cylindrical surfaces.

5. A mixing head defined in claim 1 wherein each of said recess means has a cross sectional area which increases in size toward said end face.

6. A mixing head defined in claim 5 wherein said recess means are defined by downwardly divergent planar flanks.

7. A mixing head defined in claim 5 wherein said recess means are defined by cylindrical surfaces.

8. A mixing head defined in claim 1 wherein said recess means have axial lengths of not greater than one third the axial length of said chamber.

9. A mixing head defined in claim 8 wherein said recess means are defined by downwardly divergent planar flanks.

10. A mixing head defined in claim 8 wherein said recess means are defined by cylindrical surfaces.

11. A mixing head defined in claim 8 wherein said recess means have axial lengths of greater than one fifth, but not greater than one third, of the length of said chamber.

12. A mixing head defined in claim 11 wherein said recess means are defined by downwardly divergent planar flanks.

13. A mixing head defined in claim 11 wherein said recess means are defined by cylindrical surfaces.

* * * * *